(12) United States Patent
Finley et al.

(10) Patent No.: US 7,599,163 B2
(45) Date of Patent: Oct. 6, 2009

(54) SYSTEM AND METHOD FOR DRIVING AN INDUSTRIAL CONTROL DEVICE

(75) Inventors: Kenneth Finley, Mead, CO (US); Michael J. Zolock, Berthoud, CO (US); Brian Lee, Fort Collins, CO (US)

(73) Assignee: Advanced Energy Industries, Inc., Fort Collins, CO (US)

( * ) Notice: Subject to any disclaimer, the term of this patent is extended or adjusted under 35 U.S.C. 154(b) by 0 days.

(21) Appl. No.: 12/118,886

(22) Filed: May 12, 2008

(65) Prior Publication Data

US 2008/0212253 A1 Sep. 4, 2008

Related U.S. Application Data

(63) Continuation of application No. 11/177,814, filed on Jul. 8, 2005, now Pat. No. 7,394,639.

(51) Int. Cl.
*H01H 47/00* (2006.01)
(52) U.S. Cl. .................................................. 361/207
(58) Field of Classification Search .................. 361/207
See application file for complete search history.

(56) References Cited

U.S. PATENT DOCUMENTS

| 6,095,175 | A  | * | 8/2000 | Miller et al. .............. 137/15.18 |
| 6,376,966 | B1 | * | 4/2002 | Gallmeyer et al. .......... 310/317 |
| 2002/0033644 | A1 | * | 3/2002 | Takamura et al. ........... 307/109 |
| 2006/0098036 | A1 | * | 5/2006 | Gardner ....................... 347/10 |

* cited by examiner

*Primary Examiner*—Stephen W Jackson
*Assistant Examiner*—Scott Bauer
(74) *Attorney, Agent, or Firm*—Neugeboren O'Dowd PC; Sean R. O'Dowd

(57) ABSTRACT

A process control apparatus including an actuator configured to effect changes in an industrial process, a power supply, a plurality of current switches coupled between the actuator and the power supply and a controller coupled to the plurality of current switches. The controller is configured to selectively close one or more of the plurality of current switches so as to provide a selectable level of current from the power supply to the actuator. In variations, a plurality of discharge switches are coupled to the actuator and the controller is configured to selectively close the discharge switches so as to provide a selectable level of charge to discharge from the actuator.

7 Claims, 6 Drawing Sheets

SYSTEM AND METHOD FOR DRIVING AN INDUSTRIAL CONTROL DEVICE

PRIORITY

This application is a continuation of U.S. patent application Ser. No. 11/177,814 filed on Jul. 8, 2005 now U.S. Pat. No. 7,394,639 entitled System and method for Driving an Industrial Control Device, which is incorporated by reference in its entirety.

RELATED APPLICATIONS

The present application is related to commonly owned and assigned application Ser. No. 10/985,775, entitled REACTIVE LOAD RESONANT DRIVE CIRCUIT, which is incorporated herein by reference.

FIELD OF THE INVENTION

The present invention relates to control systems, and in particular, but not by way of limitation, the present invention relates to systems and methods for driving an actuator.

BACKGROUND OF THE INVENTION

Actuators are used in a variety of applications to control to one or more aspects of an industrial process. For example, actuators are used to operate mechanical valves that regulate the flow of materials in such diverse applications as automobile fuel injectors, hydraulic servovalves, and ink jet printer nozzles. One particular type of actuator is a piezoelectric actuator, which is a nano-positioning device that deforms its shape in response to a stimulus of electrical charge In gas delivery applications, particularly those involving high-speed processes, the time required to actuate a control valve can directly affect the performance of a mass flow controller. A typical mass flow controller product stimulates a piezoelectric actuator by transferring charge from a power source to the actuator load. Charge transfer rate can be increased by increasing the peak current. The speed of charge transfer is limited, however, by peak current stresses placed on the internal bond wires connecting the drive circuit to the piezoelectric actuator, as well as by practical considerations of the cost, size, and electrical isolation of high-current switches and other components.

As a result, contemporary mass flow controller devices tend to have relatively slow actuation times—on the order of several hundred milliseconds. For many process applications, these actuation times impose an undesirable lower limit on the open time, or upper limit on the repetition rate at which the controller may be operated.

As an alternative to in-line mass flow control, a mass flow diverter may be employed in applications requiring higher speed control of minute feed gas quantities. In this approach, a pneumatically actuated valve is located on a gas stream conduit venting continuously from, a source. To inject a quantity of gas into a process, the valve is driven rapidly to a position that diverts the stream into the process environment, and then returned rapidly to the venting position. Use of high-speed pneumatics to drive the diverter valve allows For short actuation times (on the order of tens of milliseconds) and therefore greater control over the delivered gas quantity. In addition to the added cost and complexity of this approach, another significant disadvantage is that the vented material often cannot be recovered due to contamination concerns. For many processes, particularly in the manufacture of semiconductor devices, this can result in significant waste of expensive reed gas materials along with all attendant need for scrubbing or abating greater quantities of the gases downstream of the process.

Although present devices are functional to an extent, they are not sufficiently responsive or otherwise satisfactory. Accordingly, a system and method are needed to address the shortfalls of present technology and to provide other new and innovative features.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

In one exemplary embodiment, the present invention may be characterized as a process control apparatus that includes an actuator configured to effect changes in an industrial process, a power supply, a plurality of current switches coupled between the actuator and the power supply and a controller coupled to the plurality of current switches. The controller in this embodiment is configured to selectively close one or more of the plurality of current switches so as to provide a selectable level of current from the power supply to the actuator.

In another embodiment, the invention may be characterized as a method for driving an actuator to a desired position, the method including receiving a control signal that is indicative of the desired position, selecting, from among potential current levels, a particular current level, wherein the particular current level is related to an amount of time required to drive the actuator from an actual position to a desired position and providing a drive current at the particular current level to the actuator.

In yet another embodiment, the invention may be characterized as a process control apparatus that includes an actuator configured so as to be capable of altering an industrial process. The apparatus in this embodiment includes means for receiving a control signal that is indicative of a desired position of the actuator and means for selecting, from among a plurality of potential current levels, a particular current level to drive the actuator from an actual position to a desired position.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
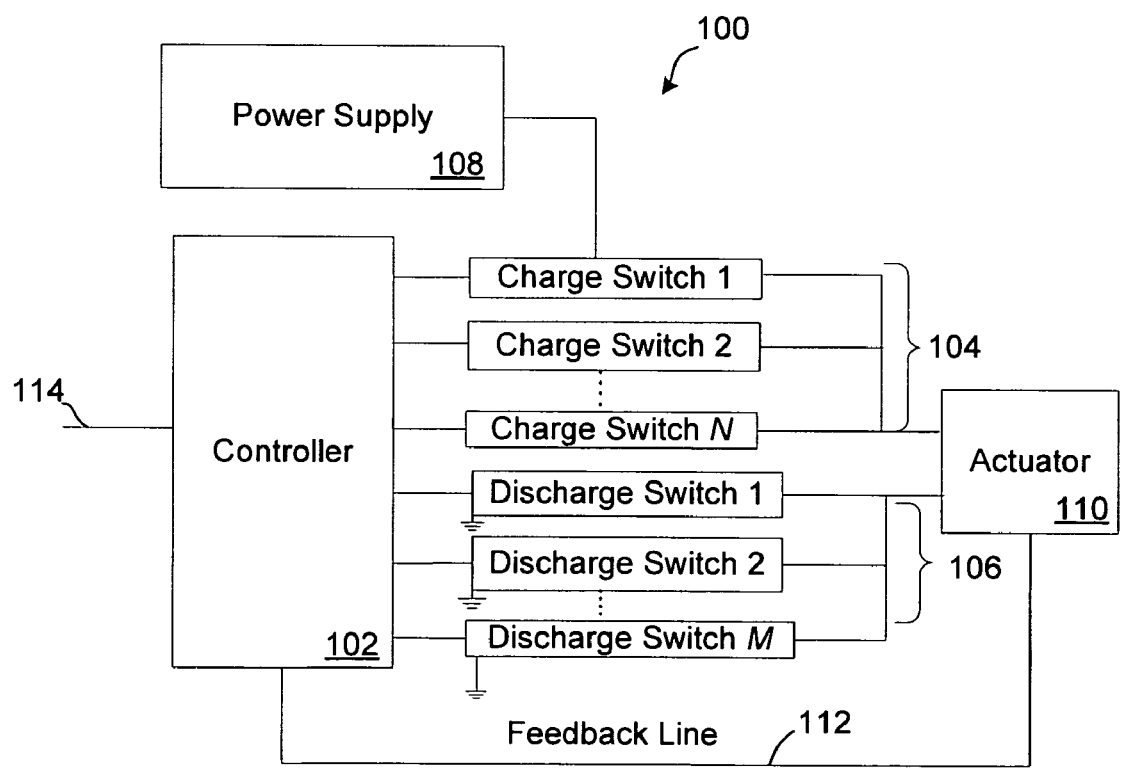
FIG. 1 is a block diagram depicting a control device in accordance with exemplary embodiments of the present invention.

Referring now to the drawings, where like or similar elements are designated with identical reference numerals throughout the several views, and referring in particular to FIG. 1, it illustrates a control device 100 in accordance with exemplary embodiments of the present invention.

As shown, the control device 100 in the present embodiment includes a controller 102 that is coupled both to N charge switches 104 and M discharging switches 106. Each of the N charge switches 104 is coupled between a power supply 108 and an actuator 110 so that each of the N charge switches 104 is capable of forming one of N current paths between the power supply 108 and the actuator 110. As shown, each of the M discharge switches 106 in this embodiment is coupled between ground and the actuator 110 so that each of the M discharge switches 106 is capable of forming one of M current paths between ground and the actuator 110.

Also shown coupled to the controller 102 are a feedback line 112 and a control line 114. The feedback line 112 is coupled between the actuator 110 and the controller 102 so as to provide a signal to the controller 102 indicative of a status of the actuator 110. Although depicted as being coupled to the actuator 110 in the present embodiment, it should be recognized that the feedback line 112 in other embodiments may be coupled to a sensor (e.g., a mass flow sensor) that monitors the effect of the actuators movement. The control line 114 in the exemplary embodiment is coupled to the controller 102 so as to allow a control signal, which is indicative of a desired actuator position, to be sent to the controller 102.

The control device 100 depicted in FIG. 1 may be operated in a variety of ways to provide a level of current to the actuator 100 that is selected to provide improved response time and/or improved control to the actuator. For example, any one of the charge switches 104 may be closed at a time or any combination of two or more the charge switches 104 may be operated simultaneously so as to provide a dynamic level of current to the actuator 110 in accordance with the position of the actuator 110.

For instance, if the actuator 110 needs to move a substantial distance to reach a desired control position, some or all of the charge switches 104 may be closed so as to provide a higher level of current to the actuator 110. Similarly, if the actuator 110 is relatively close to a desired control position, only one of the charge switches 104 may be closed to drive the actuator 110 with a lower level of current. In accordance with several embodiments, the number of charge switches 104 activated is dynamically varied on an ongoing basis to provide both good control and improved response time.

In several embodiments, the number of switches 104 that are simultaneously closed is related to an amount of time required to move the actuator 110 from an actual position to a desired position. In some embodiments for example, the number of charge switches 104 initially activated (e.g., closed) is a function of the difference between the initial position of the actuator and the desired position of the actuator. In these embodiments, either a look up table may be employed to determine how many switches 104 should be initially closed or a calculation may be utilized to determine the number of switches. In other embodiments, one or a relatively small number charge switches 104 is initially closed, and the status of the actuator 110 is monitored so that if the actuator has not arrived at the desired position after a period of time, one or more additional current switches 104 are employed to increase the rate of movement of the actuator 110.

In a similar manner, when the actuator 110 is a type of actuator 110 that must be discharged to perform a full range of directional movement (e.g., a piezoelectric actuator), the discharge switches 106 may be operated in accordance with the embodiments described above relative to the charge switches 104. For example, any one of the discharge switches 106 may be activated (e.g., closed) at a time or any combination of two or more the discharge switches 106 may be simultaneously activated so as to provide a dynamic level of charge removal from the actuator 110.

Although the actuator 110 is described herein relative to several embodiments as a piezoelectric actuator, the actuator 110 may be realized by a variety of actuators, which may include linear, tube, disk, or bimorph/polymorph actuators, as well as ultrasonic micromotors or inchworm actuators, electromagnetic, polymer, or magnetostrictive actuators, micro pumps or radial field diaphragms; solenoid or voice coil actuators; or stepper motors. Similarly, one of ordinary skill in the art will recognize that the control device 100 may be implemented as a variety of control devices including, but not limited to, a mass flow controller, flow shut-off device or a flow pressure regulator device.

The controller 102 may be implemented by a peripheral interface controller (PIC), processor control, an application-specific integrated circuit (ASIC) or a combination of analog and/or digital devices.

In the present embodiment, each of the N charge switches 104 may be implemented as an impedance in series with a normally open switch. As discussed further herein, each of the charge switches 104 may have different impedances or one or more of the charge switches 104 may have the same impedance. In some embodiments the switch utilized in each of the charge switches 104 is a transistor (e.g., bipolar or field effect) and the impedance is a resistor.

Similarly, each of the M discharge switches 104 may be implemented as an impedance in series with a normally open switch. As discussed further herein, each of the discharge switches 106 may have different impedances or one or more of the discharge switches 106 may have the same impedance. The switch utilized in each of the discharge switches 106 may be a transistor (e.g., bipolar or field effect) and the impedance may be a resistor. Although the discharge switches 106 in the present embodiment couple the actuator 110 to ground, in a variation of this embodiment, the discharge switches 106 couple the actuator to negative voltage.

One of ordinary skill in the art will recognize that the specific implementation of the power supply 108 may vary depending upon the type of device utilized as the actuator 110. In one embodiment, where the actuator 110 is a piezoelectric actuator for example, the power supply 108 is realized by well known components to provide a voltage between 0 and 150 volts. In other embodiments, however, the power supply 108 is designed to provide substantially higher voltages (e.g., 170 volts or higher).

Figure 2:
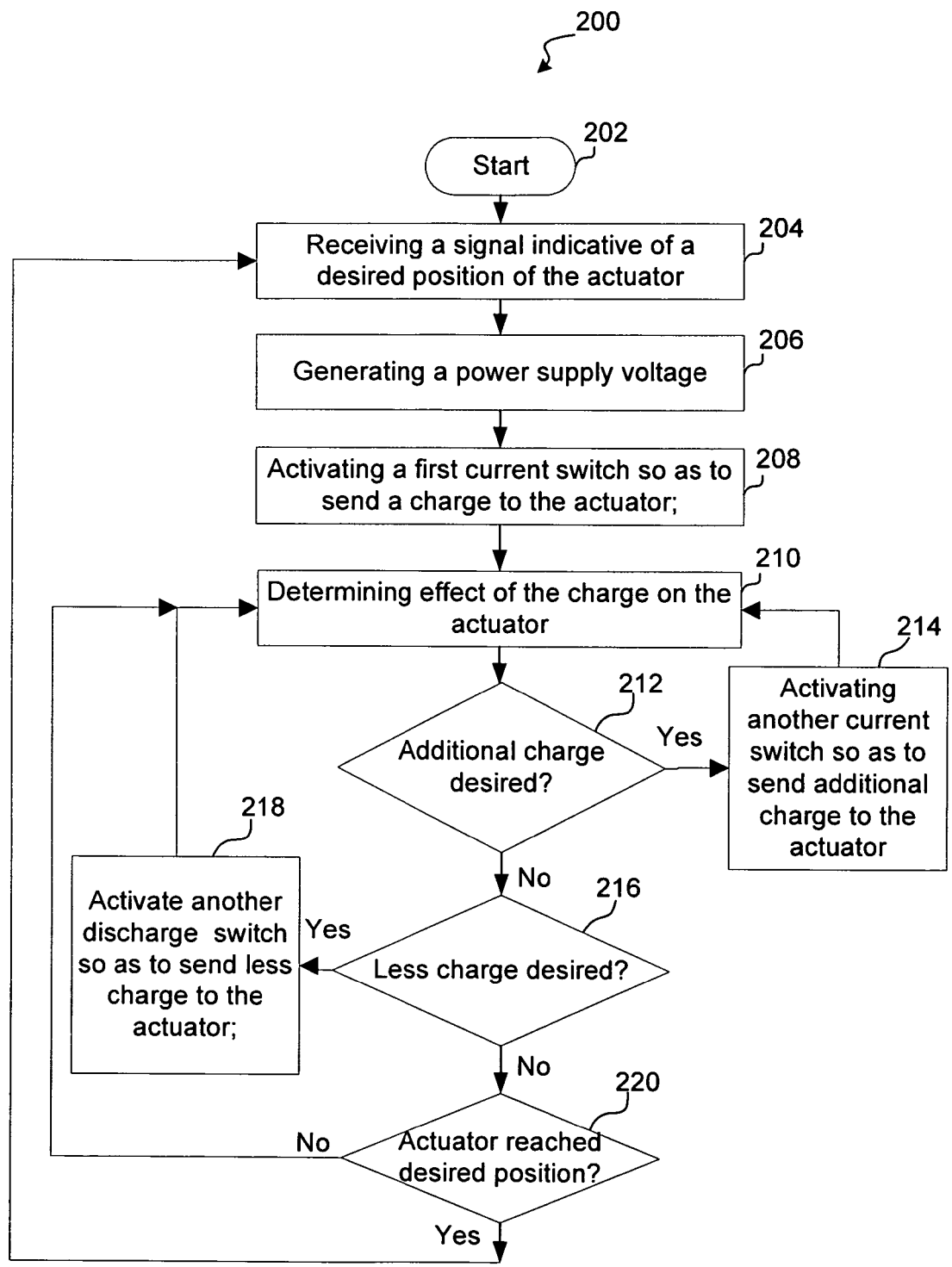
FIG. 2 is a flowchart depicting steps carried out by the control device of FIG. 1 according to several embodiments of the invention.
Figure 3A:
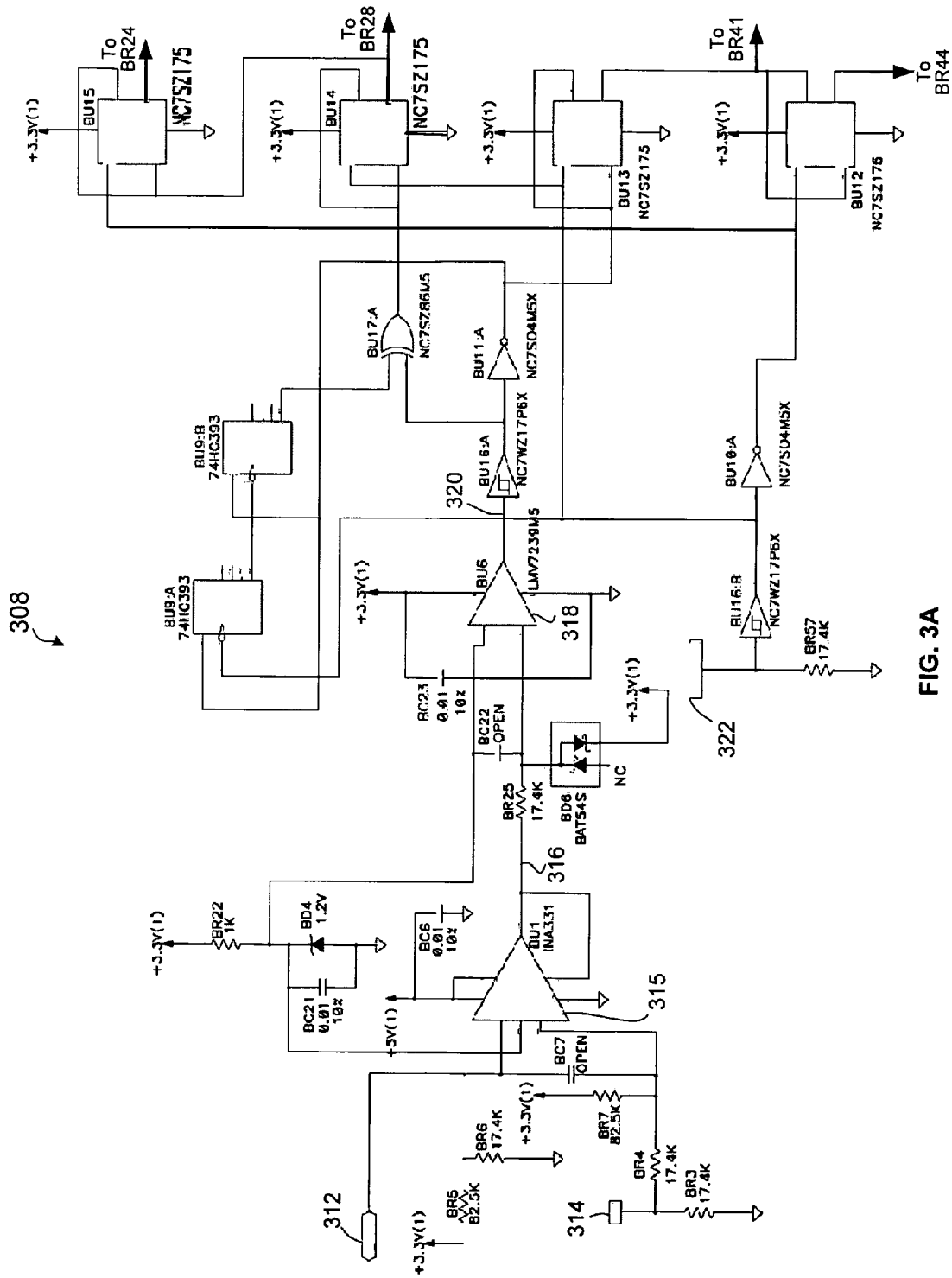
FIG. 3 is one embodiment of the control device of FIG. 1.
Figure 3B:
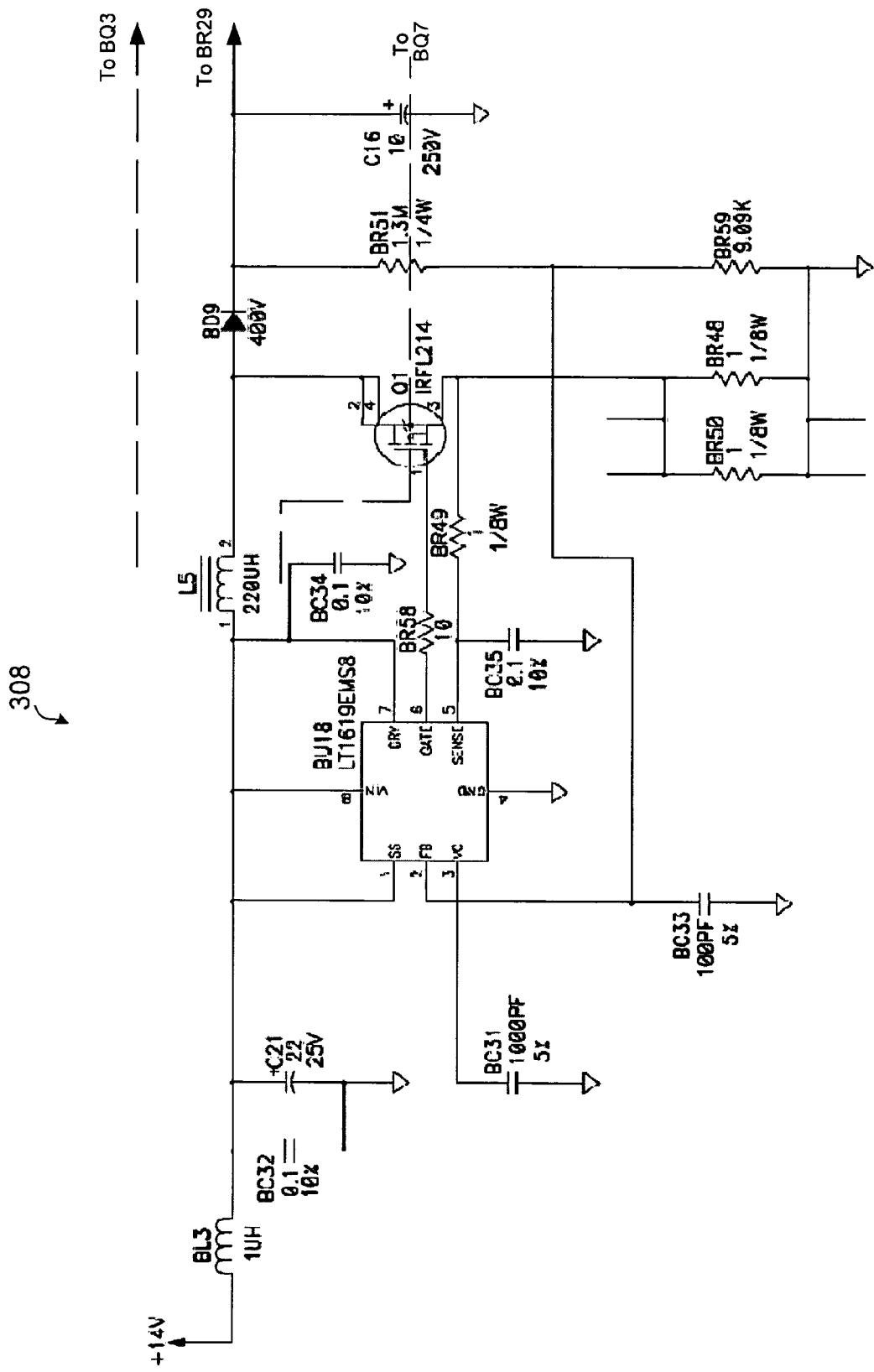
Figure 3C:
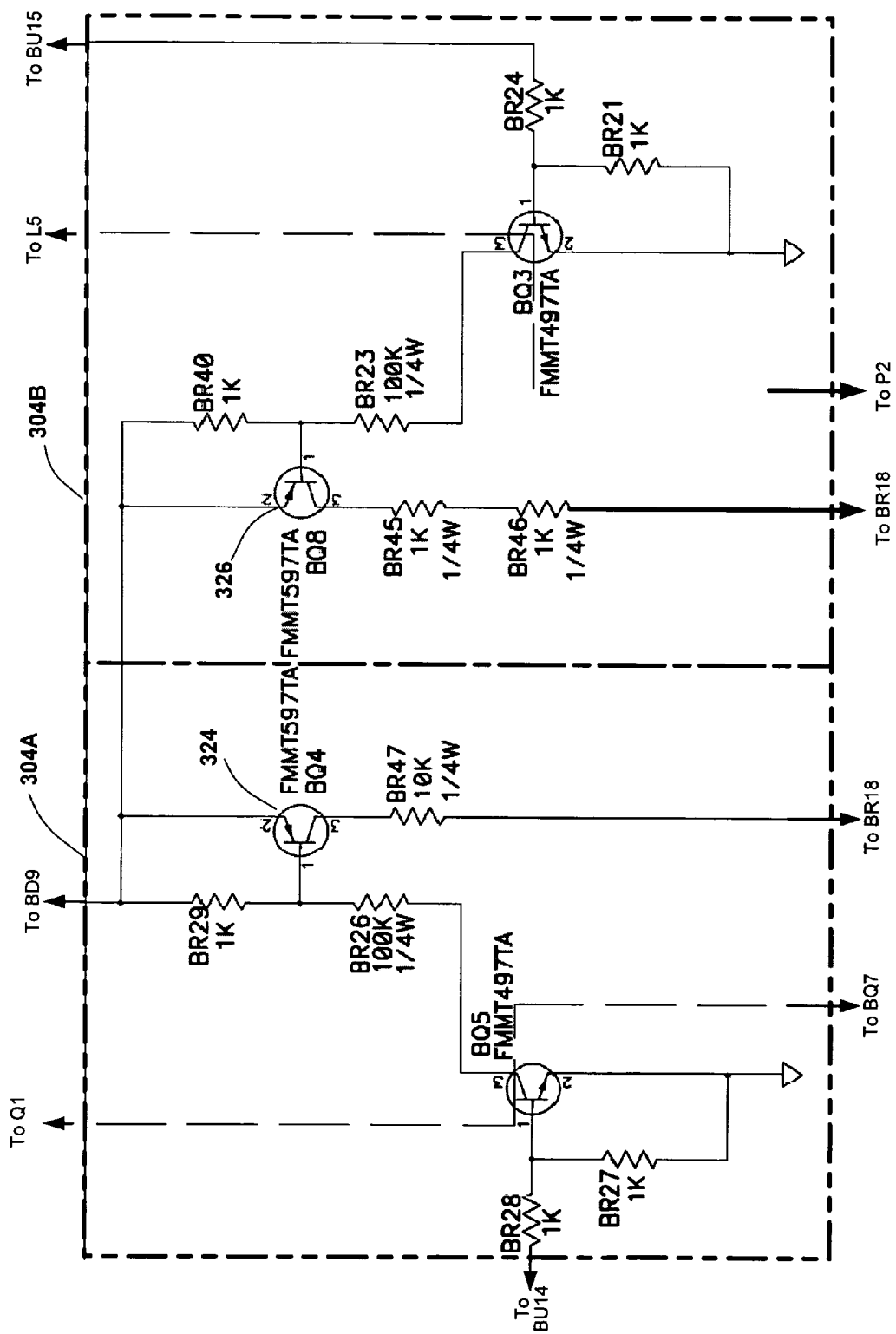
Figure 3D:
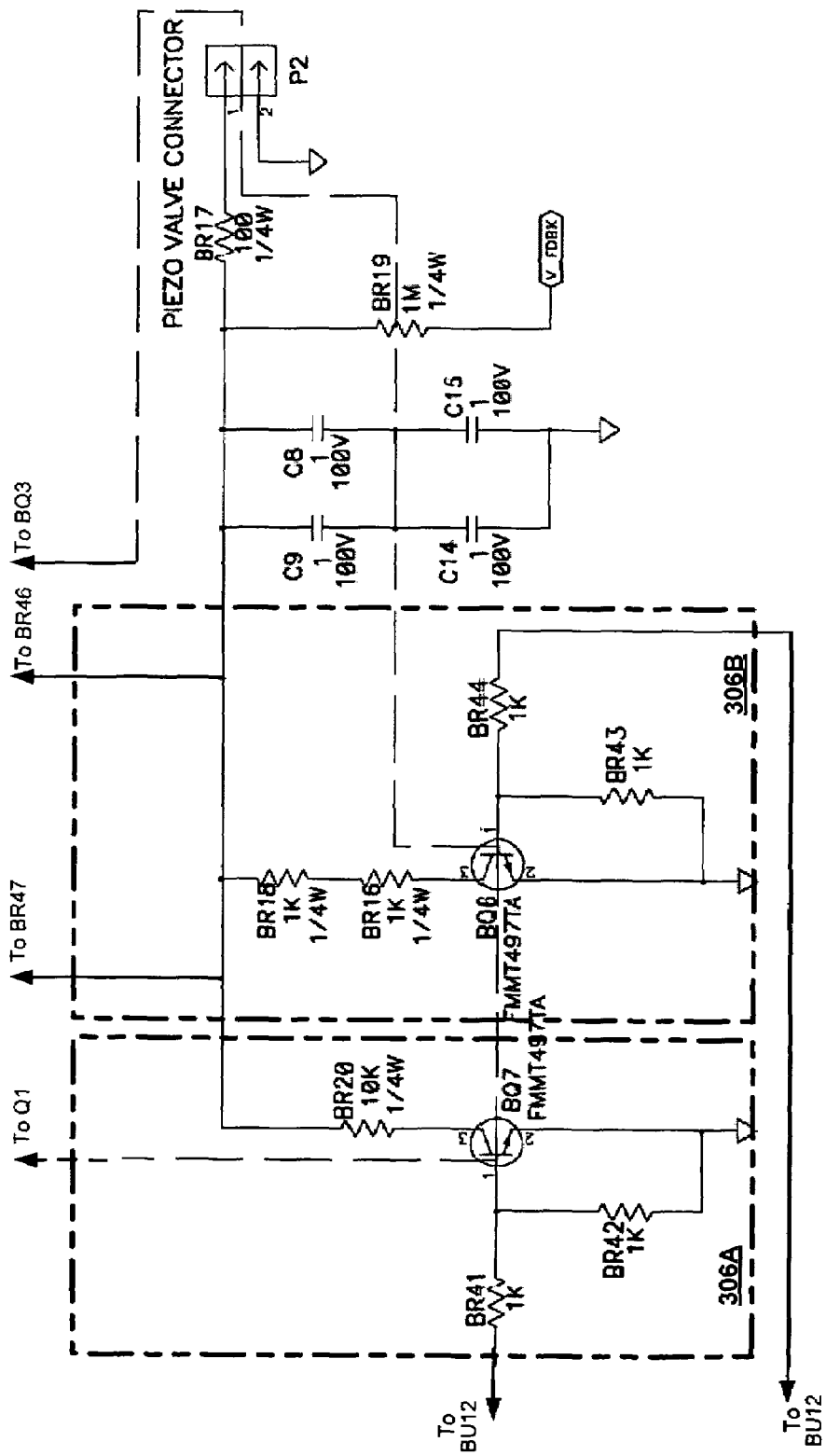

Referring next to FIG. 2, shown is a flowchart depicting steps carried out by the control device 100 of FIG. 1 when driving the actuator 110. As shown, the controller 102 initially receives a control signal via the control line 114 that is indicative of a desired position of the actuator 110 (Blocks 202, 204). In one embodiment, where the actuator 110 controls a control valve of a mass flow controller for example, the control signal corresponds to a position of the actuator 110, which provides a specific mass flow.

As shown in FIG. 2, in response to the control signal, at least one of the N charge switches 104 is activated (e.g., closed) so as to allow charge to be sent from the power supply 108, via the activated charge switch(es), to the actuator 110 (Blocks 206, 208). In the exemplary embodiment, the feedback line 112 provides an indication of the effect of charge supplied to the actuator 110 (Block 210). In one embodiment, for example, the feedback line 112 is coupled to a voltage sensor at the actuator 110 to provide an indication of the amount of charge that the actuator 110 has received, which is indicative of the position of the actuator.

If additional charge is desired to be transferred to the actuator 110 (e.g., because the voltage of the actuator 110 is not sufficient to drive the actuator to the desired position)(Block 212), then another of the charge switches 104 is activated (e.g., closed) so as to send additional charge to the actuator 110 (Block 214), and the effect of the additional charge on the actuator 110 is determined (Block 210).

If less charge is desired to be sent to the actuator 110 (e.g., because the actuator 110 is expected to be at the desired position when there is less charge on the actuator)(Block 216) then at least one of the discharge switches 106 is activated (e.g., closed) so as to drain charge from the actuator 110 (Block 218).

As shown in FIG. 2, Blocks 210-218 are carried out until the actuator 110 reaches the desired position (Block 220). The charge is then maintained until another control signal is received (Block 204).

Referring next to FIG. 3, shown is one embodiment of the control device of FIG. 1 implemented with two charge switches 304A, 304B and two discharge switches 306A, 306B. As shown in FIG. 3, a controller 302, a power supply 308, two charge switches 304A, 304B and two discharge switches 306A, 306B are exemplary embodiments of the controller 102, the power supply 108, the N charge switches 104 and the M discharge switches 106 depicted in FIG. 1, respectively.

The charge switches 304A, 304B in this embodiment include a low charge switch 304A and a high charge switch 304B. The low charge switch 304A is configured to provide a lower level of current to an actuator (not shown in FIG. 3) so as to allow the amount of charge provided to the actuator (e.g., the actuator 110) to be finely tuned. In this way, the actuator may be accurately driven with a low level of power. The high current switch 304B is configured to provide a higher level of current to the actuator so as to provide an improved response from the actuator (e.g., a faster response).

As shown, the low current switch 304A includes a bipolar transistor 324 configured so as to create a normally open emitter-collector current path that is in series with a 10K Ohm impedance. In the high current switch 304B, a bipolar transistor 326 is configured so as to create a normally open emitter-collector current path that is in series with 2K Ohms of impedance (two 1K Ohm resistors). As a consequence, the high current switch 304B, with a lower resistance path, passes a higher level of current from the power supply 308 than the low current switch 304A.

The discharge switches 306A, 306B in this embodiment include a low discharge switch 306A and a high discharge switch 306B. As shown in FIG. 3, these switches are configured in much the same way as the low and high charge switches 304A, 304B except that the discharge switches 306A, 306B couple the actuator to ground when activated instead of the power supply 308.

As shown in the embodiment depicted in FIG. 3, the controller 302 is implemented by a combination of analog and digital components. Specifically, a comparator compares a feedback 312 signal with a control signal 314 to provide an analog signal 316 that is indicative of a difference between an actual level of charge on the actuator and a desired level of charge on the actuator. This analog difference signal is then converted to a digital signal 320 by a comparator 318

In the exemplary embodiment depicted in FIG. 3, a clock 322 is utilized to effectuate periodic monitoring of the amount of charge at the actuator. Specifically, as shown in FIG. 3, each of the switches 304A, 304B, 306A, 306B is coupled to a corresponding D flip-flop, and each D flip-flop is coupled to the clock 322.

In operation, when a control signal 314 dictates a change in the position of the actuator so as to require current to be provided to the actuator, only the low current switch 304A is initially activated (i.e., the emitter-collector path of transistor 324 is conductive). If the charge in the actuator is not at the desired level (as indicated by a voltage of the feedback signal 312), after a half cycle of the clock signal, then the high current switch 304B is also activated so that both switches 304A, 304B are providing current to the actuator.

In this way, if the actuator is sufficiently close to the desired charge level, the low charge switch 304A will provide enough current to the actuator to raise the charge level of the actuator to the desired level without the use of the high charge switch 304B. If, however, the charge on the actuator is not close enough to the desired level after charging the actuator with the low charge switch 304A for a half clock cycle, then the high charge switch 304B is activated simultaneously with the low charge switch 304A so as to increase the amount of current supplied to the actuator. In one embodiment, the clock 322 is configured to generate a 10 KHz clock signal, but this is certainly not required.

In a similar manner, when a desired change in the position of the actuator requires charge to be removed from the actuator, the low discharge switch 306A is initially activated so as to discharge current from the actuator. If the charge on the actuator is still to high after a half clock cycle, the high discharge switch 306B is activated so that charge is removed from the actuator via both the high and low discharge switches 306B, 306A so as to quickly remove charge from the actuator and improve response time.

Although the control device depicted in FIG. 3 includes two charge switches 304A, 304B and two discharge switches 306A, 306B in other embodiments, additional charge switches and discharge switches are included within the same architectural framework depicted in FIG. 3. In these embodiments, if the charge at the actuator has not been reached at each successive half period of the clock signal, then an additional charge switch is closed so as to provide increasing levels of current to the actuator.

In one embodiment employing multiple charge switches, when the charge on the actuator is approaching the desired charge level, one or more switches are closed in sequence as the charge on the actuator approaches the desired charge level. In this way, the charge is provided to the actuator in an accurate and stable manner.

In conclusion, the present invention provides, among other things, a system, apparatus and method for driving an actuator with a selectable level of current. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A mass flow controller comprising:

a power supply;

an actuator configured to modulate a position of a flow control valve;

an input line configured to receive a control signal indicative of a specific mass flow, the specific mass flow corresponding to a desired actuator position;

a first current switch disposed to create a first current path between the power supply and the actuator;

a second current switch disposed to create a second current path between the power supply and the actuator; and a controller coupled to the first and second current switches, wherein the controller is configured to close both the first and second current switches to simultaneously provide current to the actuator via the first and second current switches so as to provide a desired rate of increase of charge in the actuator, and the controller is configured to initially close the first current switch and open the second current switch so as to initially provide current to the actuator via the first current switch, and the controller is configured to close the second current switch in response to a rate of increase of charge in the actuator being less than the desired rate.

2. The mass flow controller of claim 1, including:

a feedback line coupled to the controller and the actuator, the feedback line providing, to the controller, an indication of a level of charge on the actuator.

3. The mass flow controller of claim 1, wherein the first current switch is configured to provide a lower level of current to the actuator than the second current switch.

4. A mass flow controller comprising:

a power supply;

an actuator configured to modulate a position of a flow control valve;

an input line configured to receive a control signal indicative of a specific mass flow, the specific mass flow corresponding to a desired actuator position;

a first current switch disposed to create a first current path between the power supply and the actuator;

a second current switch disposed to create a second current path between the power supply and the actuator; and a controller coupled to the first and second current switches, wherein the controller is configured to simultaneously close both the first and second current switches depending upon a distance the actuator needs to move to reach the desired actuator position, and the controller is configured to close only the first current switch when a position of the actuator is relatively close to a desired control position.

5. The mass flow controller of claim 4, including:

a feedback line coupled to the controller and a mass flow sensor, the feedback line providing, to the controller, an indication of a mass flow through the control valve.

6. The mass flow controller of claim 4, including:

a feedback line coupled to the controller and the actuator, the feedback line providing, to the controller, an indication of a position of the actuator.

7. The mass flow controller of claim 4, wherein the first current switch is configured to provide a lower level of current to the actuator than the second current switch.

* * * * *